(12) United States Patent (10) Patent No.: US 12,578,734 B2
Ucar et al. (45) Date of Patent: Mar. 17, 2026

(54) COOPERATIVE MANAGEMENT STRATEGIES FOR UNSAFE DRIVING

(71) Applicant: Toyota Motor Engineering & Manufacturing North America, Inc., Plano, TX (US)

(72) Inventors: Seyhan Ucar, Mountain View, CA (US); Hao Yang, Hamilton (CA); Yashar Zeiynali Farid, Mountain View, CA (US)

(73) Assignees: Toyota Motor Engineering & Manufacturing North America, Inc, Plano, TX (US); Toyota Jidosha Kabushiki Kaisha, Toyota (JP); McMaster University, Hamilton (CA)

( * ) Notice: Subject to any disclaimer, the term of this patent is extended or adjusted under 35 U.S.C. 154(b) by 256 days.

(21) Appl. No.: 18/335,257

(22) Filed: Jun. 15, 2023

(65) Prior Publication Data

US 2024/0420573 A1 Dec. 19, 2024

(51) Int. Cl.
| | |
|---|---|
| *G05D 1/617* | (2024.01) |
| *B60W 50/00* | (2006.01) |
| *G05D 1/692* | (2024.01) |
| *G08G 1/09* | (2006.01) |
| *G08G 1/0965* | (2006.01) |

(Continued)

(52) U.S. Cl.
CPC ......... *G05D 1/619* (2024.01); *B60W 50/0097* (2013.01); *G05D 1/617* (2024.01); *G05D 1/692* (2024.01); *G08G 1/09* (2013.01); *G08G 1/0965* (2013.01); *G08G 1/0968* (2013.01); *G08G 1/162* (2013.01); *G08G 1/166* (2013.01)

(58) Field of Classification Search
CPC ........ G05D 1/619; G05D 1/617; G05D 1/692; B60W 50/0097; G08G 1/09; G08G 1/0965; G08G 1/0968; G08G 1/162; G08G 1/166
See application file for complete search history.

(56) References Cited

U.S. PATENT DOCUMENTS

| | | | |
|---|---|---|---|
| 7,451,033 B2 | 11/2008 | Xu et al. | |
| 8,428,843 B2 | 4/2013 | Lee et al. | |

(Continued)

FOREIGN PATENT DOCUMENTS

| | | | | |
|---|---|---|---|---|
| CN | 113793534 A | * | 12/2021 | ............. G08G 1/166 |
| TW | 201544377 A | * | 12/2015 | ............ B60W 40/04 |

OTHER PUBLICATIONS

Translation of CN-113793534-A, 11 pages (Year: 2021).*

(Continued)

*Primary Examiner* — Dale W Hilgendorf
(74) *Attorney, Agent, or Firm* — Christopher G. Darrow; Darrow Mustafa PC

(57) ABSTRACT

System, methods, and other embodiments described herein relate to implementing cooperative management strategies. In one embodiment, a method includes determining a severity score and a risk area. The method may then determine whether vehicles should belong to a first vehicle set, which may perform a cooperative vehicle response action, or a second vehicle set, in which individual response actions may be performed. The method may then generate a cooperative response action or an individual response action corresponding to the cooperative or individual vehicle sets, provided such vehicle sets are not empty.

20 Claims, 9 Drawing Sheets

(51) Int. Cl.
    *G08G 1/0968*       (2006.01)
    *G08G 1/16*         (2006.01)

(56)             References Cited

U.S. PATENT DOCUMENTS

| | | | |
|---|---|---|---|
| 9,604,652 | B2 | 3/2017 | Strauss |
| 10,012,993 | B1 * | 7/2018 | Matus .................. G08G 1/0112 |
| 10,239,529 | B2 * | 3/2019 | Filev .................. G08G 1/09675 |
| 10,421,459 | B2 | 9/2019 | Goldman-Shenhar et al. |
| 10,540,892 | B1 * | 1/2020 | Fields .................. G07C 5/0841 |
| 10,864,911 | B2 * | 12/2020 | Jurca ..................... G06V 20/56 |
| 11,212,654 | B2 * | 12/2021 | Bai ..................... B60W 30/143 |
| 11,380,198 | B2 * | 7/2022 | Ucar .................... G08G 1/0141 |
| 11,485,377 | B2 | 11/2022 | Lu et al. |
| 11,584,389 | B2 * | 2/2023 | Gogna ................. G05D 1/0212 |
| 12,377,879 | B2 * | 8/2025 | Jha .................... B60W 60/0017 |
| 2010/0057361 | A1 * | 3/2010 | Caveney ............... G08G 1/161 |
| | | | 701/469 |
| 2013/0060401 | A1 * | 3/2013 | Hahne .............. B60W 30/0956 |
| | | | 701/1 |
| 2018/0082590 | A1 * | 3/2018 | MacNeille ............... G08G 1/22 |
| 2018/0208195 | A1 * | 7/2018 | Hutcheson ........... B60W 50/14 |
| 2018/0299906 | A1 * | 10/2018 | Harvey ............... G05D 1/0297 |
| 2018/0362033 | A1 * | 12/2018 | Newman ............... B60W 50/12 |
| 2019/0098471 | A1 * | 3/2019 | Rech ........................ G08G 1/22 |
| 2020/0117220 | A1 * | 4/2020 | Paglieroni .............. G05D 1/104 |
| 2020/0361453 | A1 * | 11/2020 | Park ............... B60W 30/18163 |
| 2021/0056854 | A1 * | 2/2021 | Ucar ................... G05D 1/0295 |
| 2021/0061098 | A1 * | 3/2021 | Parker .................. G08G 1/0965 |
| 2021/0101618 | A1 * | 4/2021 | Levy ................. B60W 60/0015 |
| 2021/0129865 | A1 * | 5/2021 | Jeong ..................... G08G 1/162 |
| 2021/0300352 | A1 * | 9/2021 | Newman ............. B60W 30/095 |
| 2022/0032924 | A1 | 2/2022 | Jeihani et al. |
| 2022/0035365 | A1 | 2/2022 | Ucar et al. |
| 2022/0036728 | A1 | 2/2022 | Ucar et al. |
| 2022/0068122 | A1 * | 3/2022 | Ucar ......................... G08G 1/22 |
| 2022/0080977 | A1 * | 3/2022 | Ucar .................... B60W 40/09 |
| 2022/0111867 | A1 | 4/2022 | Trask et al. |
| 2022/0258732 | A1 * | 8/2022 | Avedisov .......... B60W 30/0956 |
| 2022/0332350 | A1 * | 10/2022 | Jha ................... B60W 30/0956 |
| 2022/0388505 | A1 * | 12/2022 | Sharma Banjade ......................... |
| | | | G08G 1/096783 |
| 2024/0412631 | A1 * | 12/2024 | Ucar ............... G08G 1/096791 |
| 2025/0225865 | A1 * | 7/2025 | Yang ................... G08G 1/0967 |
| 2025/0225874 | A1 * | 7/2025 | Yang ................... G08G 1/0112 |

OTHER PUBLICATIONS

Translation of TW-201544377-A, 11 pages (Year: 2015).*
Pohl et al. "A driver-distraction-based lane-keeping assistance system", Proceedings of the Institution of Mechanical Engineers, Part 1. vol. 221, Issue 4.
Muzahid et al. "Multiple vehicle cooperation and collision avoidance in automated vehicles: survey and an AI-enabled conceptual framework", Sci Rep 13, 603 (2023).
Szumska et al. "The Effect of Aggressive Driving on Vehicle Parameters", Energies 13, No. 24: 6675 (2020).

* cited by examiner

900

COOPERATIVE MANAGEMENT STRATEGIES FOR UNSAFE DRIVING

TECHNICAL FIELD

The subject matter described herein relates, in general, to cooperative management strategies for connected vehicles, and, more particularly, to determining individual or cooperative management actions to avoid vehicular threats.

BACKGROUND

Vehicles may be equipped with automated driving assistance systems that communicate with each other, but nonetheless have to contend with vehicles being improperly driven by human operators. For example, connected automated vehicles may have to contend with aggressive driving, such as tailgating and lane cutting; distracted driving, such as delayed responses or swerving arising from a failure to a pay attention; drunk driving arising from inebriation or other impairments; reckless driving such as running red lights and excessive speeding; and disruptive driving, such as driving too slowly or signaling too early. In addition, connected autonomous vehicles may have to contend with anomalies arising from negligence (e.g., debris coming off the back of trucks), or other causes (e.g., wind gusts around large vehicles) that may pose a significant threat to one or more vehicles.

SUMMARY

In one embodiment, example systems and methods relate to a manner of implementing cooperative management strategies for connected vehicles.

In one embodiment, a cooperative management system is disclosed. The vehicle management system includes one or more processors and a memory communicably coupled to the one or more processors. The memory stores a command module including instructions that when executed by the one or more processors cause the one or more processors to determine a severity score and a risk area; determine a first vehicle set including vehicles that satisfy a first criteria indicating that a vehicular threat is dangerous to the vehicle and a second criteria indicating that a cooperative response action involving the vehicle improves safety for a vehicle of the first vehicle set; determine a second vehicle set including other vehicles that satisfy the first criteria and do not satisfy the second criteria; generate, if the first vehicle set is not empty, the cooperative response action to coordinate a cooperative set of driving maneuvers between two or more vehicles of the first vehicle set; and generate, if the second vehicle set is not empty, an individual response action to implement an individual set of driving maneuvers.

In one embodiment, a non-transitory computer-readable medium including instructions that when executed by one or more processors cause the one or more processors to perform one or more functions is disclosed. The instructions include instructions to determine a severity score and a risk area; determine a first vehicle set including vehicles that satisfy a first criteria indicating that a vehicular threat is dangerous to the vehicle and a second criteria indicating that a cooperative response action involving the vehicle improves safety for a vehicle of the first vehicle set; determine a second vehicle set including other vehicles that satisfy the first criteria and do not satisfy the second criteria; generate, if the first vehicle set is not empty, the cooperative response action to coordinate a cooperative set of driving maneuvers between two or more vehicles of the first vehicle set; and generate, if the second vehicle set is not empty, an individual response action to implement an individual set of driving maneuvers.

In one embodiment, a method for implementing cooperative management strategies for connected vehicles is disclosed. In one embodiment, the method includes determining a severity score and a risk area; determining a first vehicle set including vehicles that satisfy a first criteria indicating that a vehicular threat is dangerous to the vehicle and a second criteria indicating that a cooperative response action involving the vehicle improves safety for a vehicle of the first vehicle set; determining a second vehicle set including other vehicles that satisfy the first criteria and do not satisfy the second criteria; generating, if the first vehicle set is not empty, the cooperative response action to coordinate a cooperative set of driving maneuvers between two or more vehicles of the first vehicle set; and generating, if the second vehicle set is not empty, an individual response action to implement an individual set of driving maneuvers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with implementing cooperative management strategies for connected vehicles are disclosed herein. Connected vehicles may observe an anomalous event involving a vehicular threat. For example, a vehicular threat may be identified based on anomalous variations in speed, acceleration, braking, lateral movements, longitudinal movements, and so on. In order to assess the extent of risk that the vehicular threat poses to other vehicles, a severity score and a risk area associated with a vehicular threat may be determined. A severity score may take the form of numerical or categorical values (e.g., 0.7, High), while the boundaries of a risk area may be defined relative to the vehicular threat.

Generally, providing cooperative response actions to react to a vehicular threat is more resource intensive than providing individual response actions. Accordingly, based upon different levels of severity scores, the presence of vehicles within or outside a risk area, or other factors, individual or cooperative response actions may be selected (e.g., individual response actions when a severity score is low, cooperative response actions when a severity score is high, cooperative response actions if vehicles are in a risk area, individual response actions if a vehicle is outside the risk area). Such an approach, for instance, allows for efficiently providing cooperative response actions for vehicles in situations that would most benefit from them, while also providing individual response actions to vehicles in less difficult circumstances. In addition, various cooperative response actions are presented that may be used to provide protection from vehicular threats or to achieve other purposes as described herein.

Figure 1:
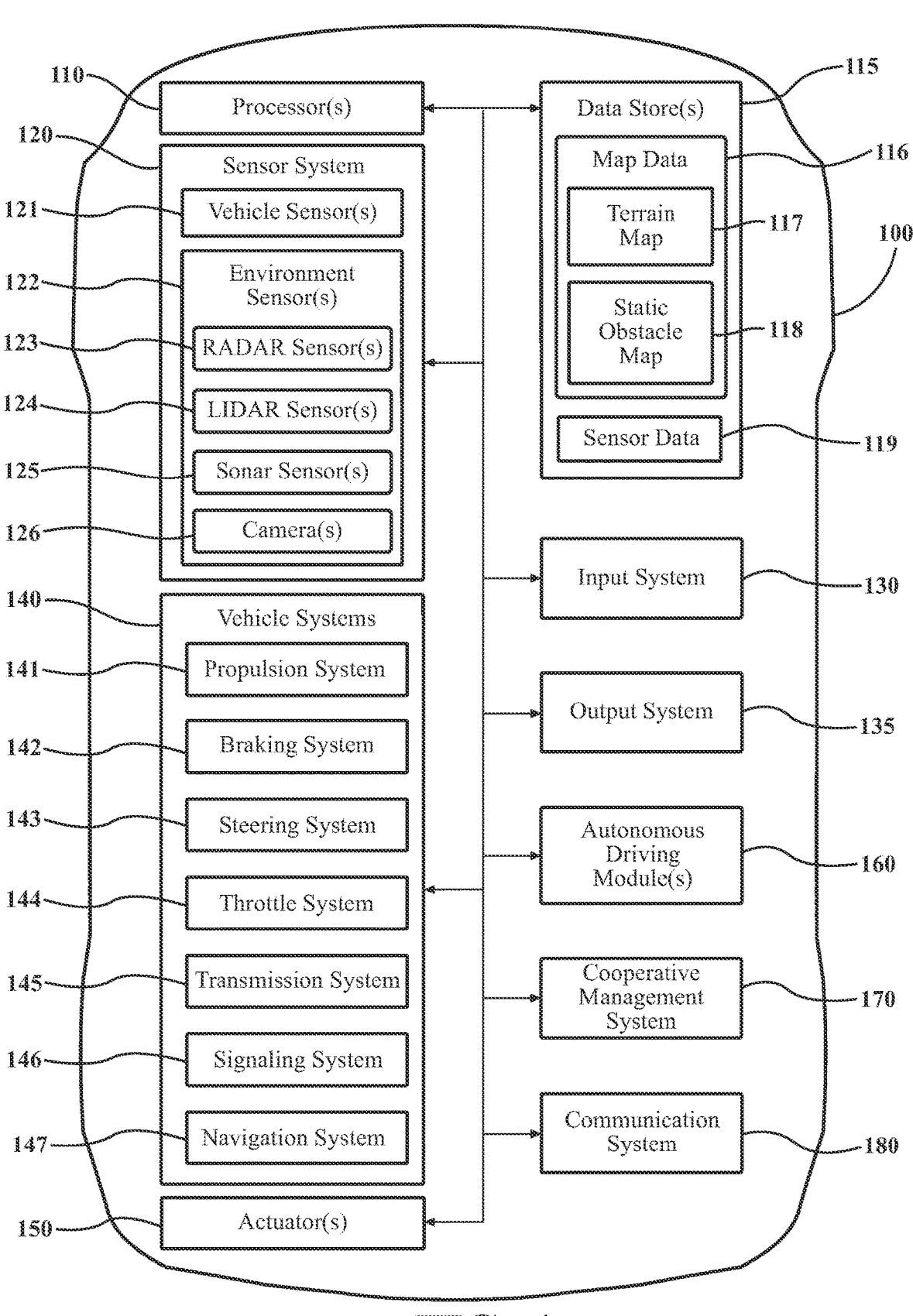
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, vehicle 100 is an automobile. While arrangements will be described herein with respect to automobiles, it will be understood that embodiments are not limited to automobiles. In some implementations, vehicle 100 may be any robotic device or form of motorized transport that, for example, includes sensors to perceive aspects of the surrounding environment, and thus benefits from the functionality discussed herein associated with cooperative management strategies. As a further note, this disclosure generally discusses vehicle 100 as traveling on a roadway with surrounding vehicles, which are intended to be construed in a similar manner as vehicle 100 itself. That is, the surrounding vehicles may include any vehicle that may be encountered on a roadway by vehicle 100.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Some of the possible elements of vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes a cooperative management system 170 that is implemented to perform methods and other functions as disclosed herein relating to implementing cooperative management strategies. As will be discussed in greater detail subsequently, cooperative management system 170, in various embodiments, is implemented partially within vehicle 100 and as a cloud-based service. For example, in one approach, functionality associated with at least one module of cooperative management system 170 is implemented within vehicle 100 while further functionality is implemented within a cloud-based computing system.

Figure 2:
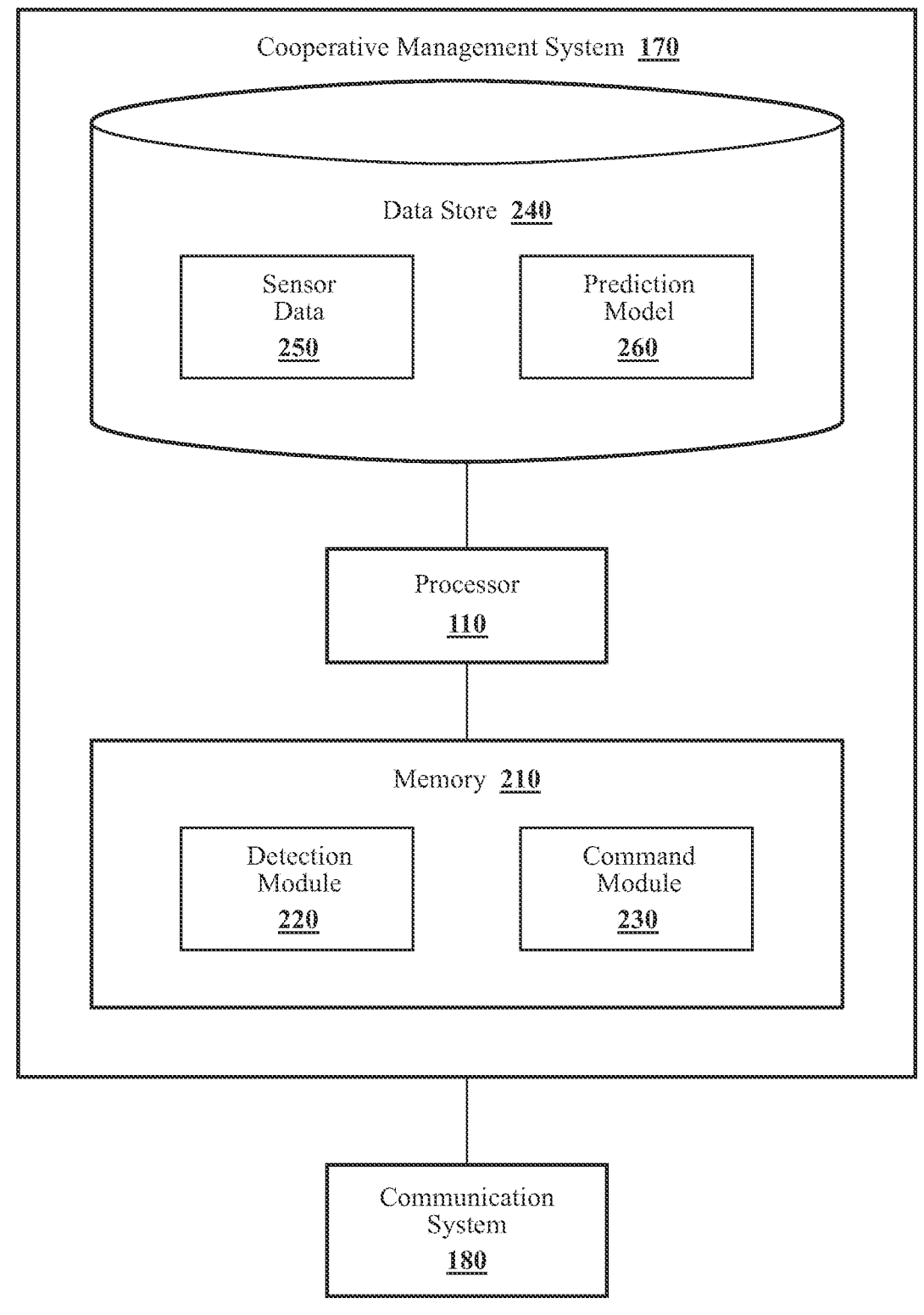
FIG. 2 illustrates one embodiment of a cooperative management system that is associated with implementing cooperative management strategies.

With reference to FIG. 2, one embodiment of cooperative management system 170 of FIG. 1 is further illustrated. Cooperative management system 170 is shown as including processor(s) 110 from vehicle 100 of FIG. 1. Accordingly, processor(s) 110 may be a part of cooperative management system 170, cooperative management system 170 may include a separate processor from processor 110(s) of vehicle 100, or cooperative management system 170 may access processor 110(s) through a data bus or another communication path. In one embodiment, cooperative management system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Figure 3:
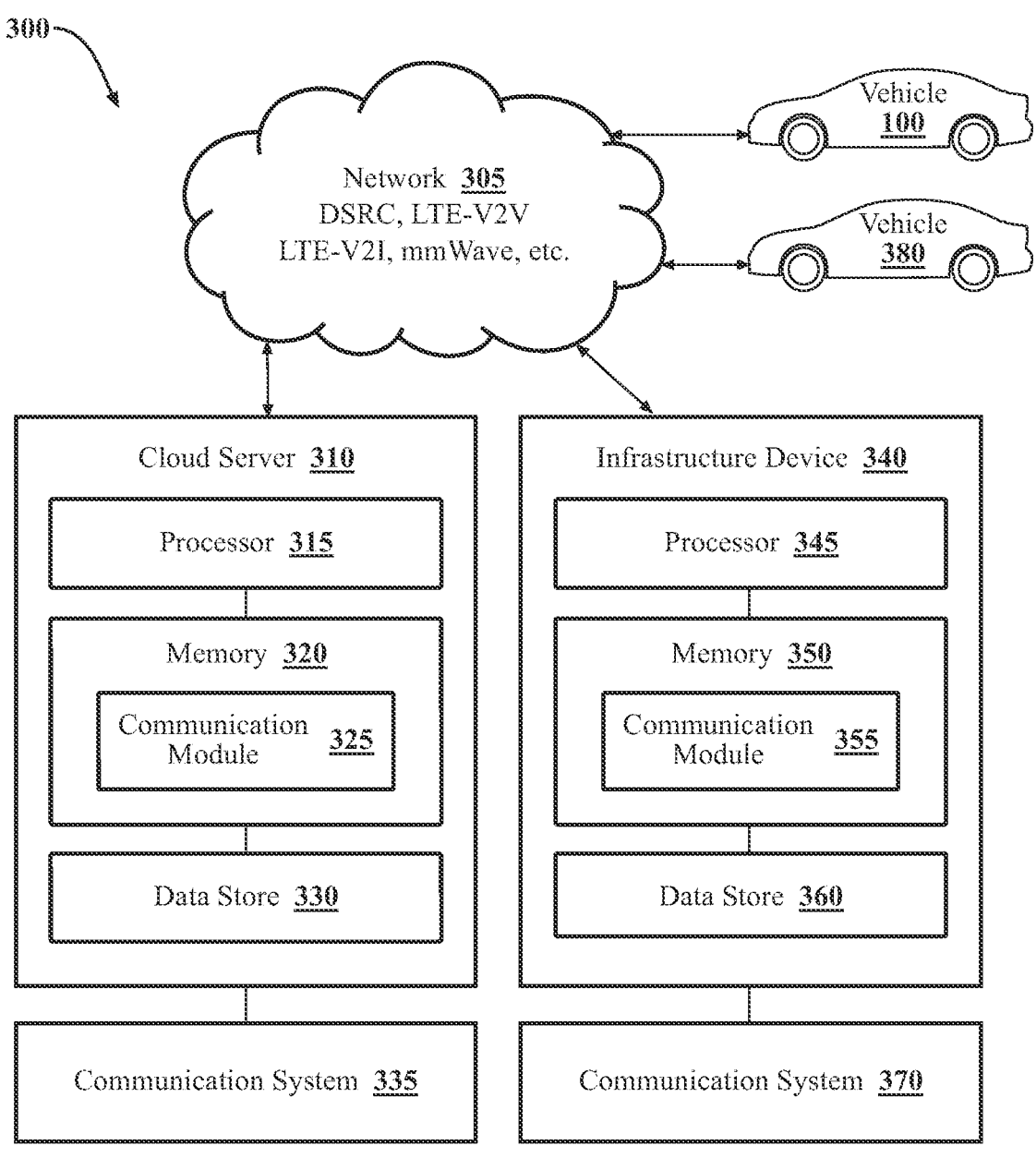
FIG. 3 illustrates one embodiment of the cooperative management system of FIG. 2 in a cloud-computing environment.

Cooperative management system 170 as illustrated in FIG. 2 is generally an abstracted form of cooperative management system 170 as may be implemented between vehicle 100 and a cloud-computing environment. FIG. 3, which is further described below, illustrates one example of a cloud-computing environment 300 that may be implemented along with cooperative management system 170. As illustrated in FIG. 3, cooperative management system 170 may be embodied at least in part within cloud-computing environment 300.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, or vehicular-related disturbances (e.g., debris, water spray). In one embodiment, detection module 220 may also acquire sensor data 250 from one or more sensors that allow for implementing cooperative management strategies.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, information about lane markings or other boundaries that may assist in evaluating anomalous events or defining risk areas. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, cooperative management system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, labels for indicating relevance to an anomalous event, and so on.

Detection module 220, in one embodiment, is further configured to perform additional tasks beyond controlling the respective sensors to acquire and provide sensor data 250. For example, detection module 220 includes instructions that may cause processor(s) 110 to detect anomalous conditions based on sensor data 250. Detection module 220 may then use sensor data 250 to determine that an anomalous event exists. For example, detection module 220 based on sensor data 250 may determine that an observed nearby-vehicle is acting unusually, such as engaging in unexpected longitudinal or lateral movements, exhibiting indications of dangerous driving (e.g., based on pre-determined patterns indicating drunk driving, distracted driving, disruptive driving, and so on), driving and maneuvering in a manner that places other vehicles in danger (e.g., excessive speeding, abrupt lane changes, tailgating), exhibiting hostile behavior (e.g., excessive honking, flashing of headlights), and so on. As another example, detection module 220 may use sensor data 250 to determine that an anomalous event exists due to observations of vehicular-related disturbances (e.g., indirect hazards arising from nearby vehicles, such as water spray arising from vehicles passing through water or operating during rain events, wind bursts from passing vehicles, debris flying off vehicles (e.g., gravel from a dump truck), and so on).

In various embodiments, detection module 220 may use techniques for predicting particular forms of driving behaviors that are known in the art. Such techniques may utilize linear theoretical models based on time series modeling and Kalman filtering; nonlinear statistical models based on a nonparametric regression modeling and chaos theory; machine learning prediction models based on neural network and support vector machines; and so on. Accordingly, such models that are known in the art, now or in the future, for predicting driving behaviors may be used to evaluate the presence or not of particular driving behaviors. Similarly, techniques for predicting other anomalous events (e.g., flying object/debris detection via a moving camera) are well known in the art and may be relied upon to establish whether such other anomalous events have occurred or not.

In one embodiment, command module 230 generally includes instructions that function to control the processor(s) 110 or collection of processors in the cloud-computing environment 300 as shown in FIG. 3 for implementing cooperative management strategies via vehicular micro-clouds.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

Cloud server 310 is shown as including a processor 315 that may be a part of cooperative management system 170 through network 305 via communication unit 335. In one embodiment, cloud server 310 includes a memory 320 that stores a communication module 325. Memory 320 is a random-access memory (RAM), read-only memory (ROM), a hard-disk drive, a flash memory, or other suitable memory for storing communication module 325. Communication module 325 is, for example, computer-readable instructions that when executed by processor 315 causes processor 315 to perform the various functions disclosed herein. Moreover, in one embodiment, cloud server 310 includes database 330. Database 330 is, in one embodiment, an electronic data structure stored in a memory 320 or another data store and that is configured with routines that may be executed by processor 315 for analyzing stored data, providing stored data, organizing stored data, and so on.

Infrastructure device 340 is shown as including a processor 345 that may be a part of cooperative management system 170 through network 305 via communication unit 370. In one embodiment, infrastructure device 340 includes a memory 350 that stores a communication module 355. Memory 350 is a random-access memory (RAM), read-only memory (ROM), a hard-disk drive, a flash memory, or other suitable memory for storing communication module 355. Communication module 355 is, for example, computer-readable instructions that when executed by processor 345 causes processor 345 to perform the various functions disclosed herein. Moreover, in one embodiment, infrastructure device 340 includes a database 360. Database 360 is, in one embodiment, an electronic data structure stored in memory 350 or another data store and that is configured with routines that may be executed by processor 345 for analyzing stored data, providing stored data, organizing stored data, and so on.

Accordingly, in addition to information obtained from sensor data 250, cooperative management system 170 may obtain information from cloud servers (e.g., cloud server 310), infrastructure devices (e.g., infrastructure device 340), other vehicles (e.g., vehicle 380), and any other systems connected to network 305. For example, network 305 may be used to form interconnected vehicular micro-clouds as shown in FIG. 4.

Figure 4:
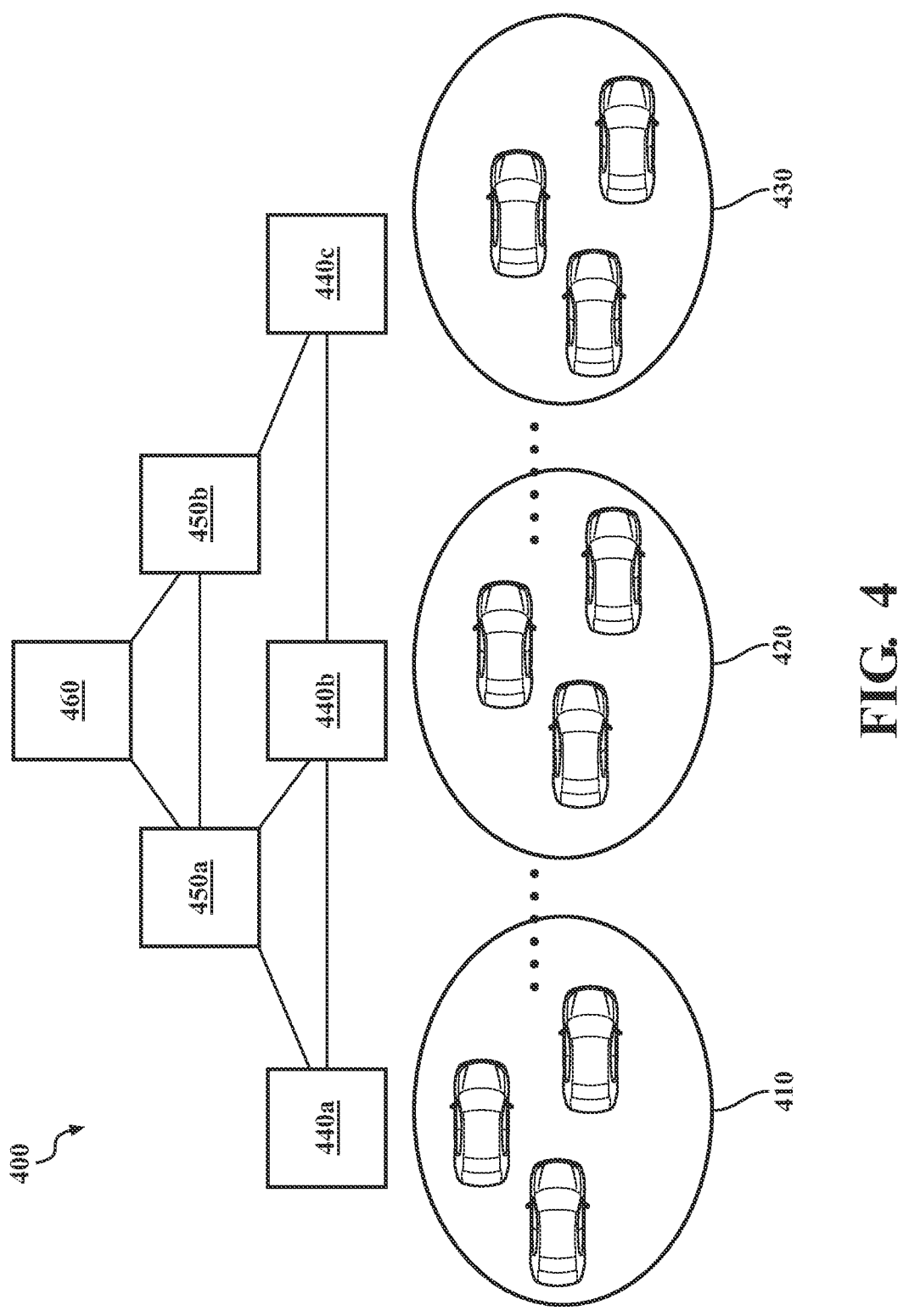
FIG. 4 illustrates one example of a vehicular micro-cloud based architecture.

With respect to FIG. 4, an example of a vehicular micro-cloud environment 400 is shown. In some embodiments, command module 230 may form, join, leave, or modify a micro-cloud of connected vehicles. For example, vehicle 100 may be part of vehicular micro-cloud 410 with a first set of vehicles, while a second set of vehicles are part of vehicular micro-cloud 420, and a third set of vehicles are part of vehicular micro-cloud 430. Vehicular micro-clouds may be stationary (e.g., a vehicular micro-cloud handling traffic through an intersection) or mobile (e.g., a vehicular micro-cloud traveling with a group of vehicles as they proceed down a highway). In some embodiments, connected vehicles may share sensor data via a vehicular micro-cloud, which if received by vehicle 100 may be stored in sensor data 250 by detection module 220. In this manner, if a vehicle in a vehicular micro-cloud detects an anomalous event, it may share the data with other vehicular micro-cloud members. In some embodiments, connected vehicles may share cooperative strategy management messages, which may convey information relating to severity scores, threat profile, vehicle trajectories (planned or estimates), coordination agreements/acknowledgements, and so on.

In some embodiments, vehicular micro-clouds may share information between each other. For example, a vehicle may be a member of both vehicular micro-cloud 410 and vehicular micro-cloud 420 (e.g., as it transitions from one to the other), such that the vehicle may be able to relay sensor data or cooperative strategy management messages between vehicular micro-cloud 410 and vehicular micro-cloud 420. As another example, vehicular micro-clouds may also be interconnected by infrastructure devices (e.g., servers 440a, 440b, 440c), which are further interconnected at a higher level (e.g., locality servers 450a-b, city server 460) or in a non-hierarchical network arrangement (e.g., mesh). In such an embodiment, the infrastructure devices may provide stationary vehicular micro-clouds for connected vehicles to join; participate in mobile vehicular micro-clouds when they are in range of an infrastructure device, or simultaneously engage in both activities.

In some embodiments, command module 230 may receive anomalous event data. For example, it may receive such anomalous event data via sensor data 250 or through vehicular micro-cloud messages received via communication system 180. Anomalous event data may include information regarding one or more vehicular threats that is associated with the anomalous event (e.g., a blue pickup truck on the right of vehicle 100); any vehicle data associated with a vehicular threat (e.g., anomalous speed, anomalous lateral activity, anomalous longitudinal activity, anomalous gap violation, anomalous speed change, anomalous lane change, anomalous braking, anomalous acceleration, anomalous honking/flashing, anomalous debris, anomalous water spray, anomalous air disturbance); the proximate location of a vehicular threat (e.g., 50 ft ahead of vehicle 100) as well as any relevant pitch, roll, or yaw information; and so on.

In some embodiments, command module 230 may determine a severity score based on anomalous event data. For example, based on pre-determined models, command module 230 may evaluate the anomalous event data to determine one or more severity scores for a vehicular threat. For example, anomalous lateral activity exhibiting slow substantial lateral deviations may score higher on a distracted driving model, but also may score low on an aggressive driving model. In some embodiments, a severity score may include a set of values based on the use of such models (e.g., distracted driving—7; aggressive driving—2). In determining a severity score, command module 230 may use pre-determined models that provide a severity score based on the frequency, magnitude, or other measurable characteristics (e.g., debris, spray, or air disturbance patterns) of a vehicular threat's actions. In some embodiments, command module 230 may use adaptive or machine learning models that provide a severity score based on the frequency, magnitude, or other measurable characteristics (e.g., debris, spray, or air disturbance patterns) of a vehicular threat's actions. For example, such models may rely on the intensity or variation in driving behavior as compared to expected/normal behavior to determine a severity score. As another example, a severity score may increase as the frequency by which an observed anomalous behavior repeats itself increases.

In some embodiments, command module 230 may send or receive a planned trajectory of vehicle 100. In some embodiments, command module 230 may send or receive planned trajectories of other vehicles near a vehicular threat. For example, autonomous vehicles in communication with command module 230 may share their current planned trajectories with each other or vehicle 100 (e.g., via a vehicular micro-cloud enabled by cloud-computing environment 300). In some instances, such sharing of planned trajectories may occur between vehicles on a regular basis. In some embodiments, sharing of planned trajectories may be initiated by command module 230 when a severity score is determined to exceed a pre-determined threshold (e.g., 0.5, Medium). For instance, if command module 230 determines that vehicular threat has a severity score exceeding a threshold, it may send notice of the severity score and vehicle 100's planned trajectory to other vehicles in communication with command module 230. These vehicles in communication with command module 230 may then reply, in part, with their own planned trajectories in response to receiving the notice of the severity score. In some embodiments, in response to the notice of a severity score, such a reply may further include any modifications by a vehicle to its planned trajectory (e.g., where immediate action the vehicle must be undertaken to avoid an accident).

In some embodiments, command module 230 may determine a threat profile based on anomalous event data, which may include a risk area associated with a vehicular threat. For example, anomalous event data may be analyzed to determine a risk area around vehicular threat, such as a vehicle associated with a severity score above a pre-determined threshold (e.g., 0.5, Medium). Risk areas may be pre-defined, such as by type of anomalous behavior (e.g., 100 ft radius around a vehicular threat if associated with drunk driving); one or more functions specifying distances for a risk area around the object based on anomalous event data (e.g., an elliptical area around the vehicular threat whose size increases in a pre-defined manner with object speed, object trajectory, etc.); or by dynamic or machine learning models evaluating the anomalous event data.

One or more risk areas may also be determined based on the anomalous event data (e.g., a first boundary around an object for a specifying a high-risk area, a second boundary outside the first boundary specifying a medium-risk area, a third boundary outside the second boundary specifying a low-risk area). In some embodiments, the risk area may further comprise an array of risk values associated with locations within the risk area (e.g., locations closer to the vehicular threat may have the highest risk values, while those closest to a risk area boundary may have the lowest risk values). The risk area may also be determined via analysis evaluated on a point-to-point basis between a vehicular threat and other vehicles in the vicinity of the vehicular threat (e.g., a vehicular threat may be a high risk to a first vehicle, thereby specifying a high-risk boundary point to the risk area at the first vehicle location; a vehicular threat may be a medium risk to a second vehicle, thereby specifying a medium-risk boundary point to the risk area at the second vehicle location). In embodiments where risk areas are determined on a point-to-point basis, command module 230 may establish boundaries to further define a risk area beyond the boundary points (e.g., by forming a circle around the vehicular threat that encompasses one or more boundary points). In various embodiments, a high risk, medium risk, low risk, or other risks as described herein may be specified by categorizations (e.g., Medium) or numerical values (e.g., 0.3, 0.5).

In some embodiments, based on the location of a vehicle within the risk area, the threat profile may be used to determine a threat score specific to that vehicle. For example, given the severity score of a vehicular threat, a threat score for a vehicle in the risk area may decrease the further it is away from the vehicular threat; the more the vehicle is outside the estimated trajectory of the vehicular threat; whether another vehicle is between the vehicle and the vehicular threat; etc. In some embodiments, a threat score may be determined based on a vehicle's position in a risk area, the vehicle's estimated or planned trajectory, the vehicular threat's estimated or planned trajectory, other factors, or any combination thereof. In some embodiments, threat scores may also be calculated for vehicles outside the risk area.

In some embodiments, a threat profile may also contain information as to hazards that may relate to potential actions of a vehicular threat. For example, a threat profile may include information as to stationary objects or road data (e.g., a barrier wall, bridge, toll gate, intersection), traffic or weather conditions (e.g., heavy traffic ahead, increased heavy rain expected in 15 minutes), or other factors that may influence the development of a strategy to address a vehicular threat. In some embodiments, a threat profile may also contain future estimates of severity scores, risk area, threat scores, or other information associated with a vehicular threat. For example, if command module 230 estimates a trajectory for a vehicular threat that shows it is likely to make a left turn at an upcoming roadway split (e.g., because it is in a left turning lane), it may estimate future severity scores, threat scores, or risk areas based on such an estimated trajectory (e.g., future threat scores may be estimated to decline after the roadway split for any vehicle whose planned trajectory is to turn right).

In some embodiments, a risk area may be adjusted or initialized based on a physics model, such as to represent debris, water spray, or another anomalous events. For example, anomalous event data may include observations of debris leaving the back of a vehicle (e.g., gravel), which may then be evaluated based on a physics model to determine the risk area (e.g., the likely area in which airborne gravel may be encountered). As another example, where air displacement affects a vehicle (e.g., when passing a vehicle), anomalous event data may be used to determine a risk area for (e.g., a first risk area around the rear left corner of a large truck and a second risk area around the front left corner of the truck, arising from high winds coming from the right of the truck). As another example, based on observing water spray from a vehicle, a risk area on the sides of the vehicle may be determined in relation to water spray. In some embodiments, a threat profile arising from debris, water spray, wind, or other situations may be used to generate threat profiles for other vehicles, such as where an event is likely to affect all vehicles within an area (e.g., rain) or where certain vehicles are determined to pose similar risks (e.g., trucks that are also likely to generate air-based disturbances around them due to high-wind conditions).

In some embodiments, command module 230 may determine a cooperative management strategy to provide for risk reduction among connected vehicles relative to the vehicular threat. In some embodiments, a cooperative management strategy may be implemented when a severity score exceeds a pre-determined threshold (e.g., 0.7, High), the location of vehicles relative to the vehicular threat (e.g., within a risk area defined by a threat profile), other factors, or any combination thereof. In implementing a cooperative management strategy, command module 230 may determine one or more individual response actions, one or more cooperative response actions, or both. In some embodiments, a cooperative management strategy may rely on thresholds to determine whether to generate one or more individual response actions, one or more cooperative response actions, or a combination of both.

For example, if a severity score with respect to vehicular threat is above a first threshold (e.g., 0.5), command module 230 may determine that a cooperative response action may be applied. If the severity score is between the first threshold and a second threshold (e.g., 0.3), command module 230 may determine that only an individual response action should be generated. And if the severity score is below the second threshold, command module 230 may not generate response actions. As another example, if a first set of vehicles with respect to vehicular threat is within a first risk area command module 230 may determine that a cooperative response action may be generated for the first set of vehicles. If a second set of vehicles with respect to vehicular threat is within a second risk area while outside the first risk area, command module 230 may determine that only individual response actions should be generated for the second set of vehicles.

In order to obtain risk reduction to a vehicle, an individual response action may include any instructions relating to driving maneuvers for the vehicle (e.g., a suggested adjustment to or limitation on a vehicle's actions in relation to a vehicular threat), provided such instructions for the vehicle to be successfully implemented do not require one or more driving maneuvers being implemented by another vehicle. For example, for vehicles following a vehicular threat, such as those outside the risk area associated with a vehicular threat, command module 230 may devise an individual response action(s) for such vehicles (e.g., maintain a speed below 55 mph, maintain a distance of at least 50 m from the vehicular threat). Individual response actions may be defined according to a particular vehicle, groups of vehicles, or an area (e.g., a stationary location; a location moving with a vehicle, such as a safety buffer space behind a vehicular threat), such that they are individually implemented by the particular vehicle, the groups of vehicles, or vehicles within an area.

For example, if vehicles are travelling at different speeds on approach to vehicular threat, an individual response action may be generated for each vehicle with different speed adjustments such that the vehicles do not enter a risk area associated with the vehicular threat. As another example, if a vehicle is determined to be able to leave a risk area associated with a vehicular threat without requiring coordination, an individual response action may be devised for such a vehicle to achieve such an outcome (e.g., speed up ahead of the vehicular threat, move to a lane further away from a vehicular threat). As another example, an individual response action may also be devised for vehicular threats involving debris, air, or water disturbances where the associated risk area may only affect one vehicle at a time (e.g., slowly approach and enter risk areas associated with a wind-based vehicular threat). As yet another example, individual response action may specify that vehicles further than certain distance from a vehicular threat should remain so, which the vehicles may then individually implement to achieve.

In order to obtain risk reduction to a vehicle, a cooperative response action may include instructions for driving maneuvers for two or more vehicles (e.g., a suggested adjustment or limitation on the vehicle's behavior in relation to a vehicular threat), where such instructions if implemented by the two or more vehicles would result in at least one coordinated movement between the two or more vehicles. For example, in higher traffic density environments, it may be necessary to coordinate the movements of vehicles near a vehicular threat so as to allow such vehicles to depart from the risk area as quickly as possible. A cooperative response action may also provide instructions for driving maneuvers in the form of trajectories for two or more vehicles (which may also include relative trajectories between vehicles), such that if the trajectories are implemented by the two or more vehicles, they will undertake a coordinated response. In determining a cooperative response action, command module 230 may consider vehicle types, vehicle occupant data (e.g., number and location of occupants in each vehicle), vehicle performance characteristics, other factors, or any combination thereof to optimize a cooperative response action. For example, a cooperative response action may prioritize placing larger vehicles in between smaller vehicles and a vehicular threat. As another example, a cooperative response action may prioritize vehicle placement in relation to number and location of occupants in various vehicles such that the risk by the vehicular threat to the occupants is minimized (e.g., a vehicle with empty front passenger seat may be instructed to pass a vehicular threat such that the passenger seat is between the driver and the vehicular threat).

In general, command module 230 as part of an individual or cooperative response action may provide instructions to a vehicle to make lane changes; to follow another vehicle; to maintain distances from another vehicle; to follow a trajectory; to follow speed advisories or restrictions; and so on. Further, with respect to cooperative response actions, such instructions may be coordinated by command module 230 such that two or more connected vehicles implement the instructions in a manner allowing for a coordinated response to the vehicular threat. In addition, with respect to any changes in behavior by the vehicular threat or other non-connected vehicles, command module 230 may revise or issue additional individual or cooperative response actions as a severity score increases or decreases, as a risk area associated with the vehicular threat changes, as other factors change, or any combination thereof.

In general, an individual or cooperative response actions will seek to remove vehicles away from a vehicular threat so as to achieve risk reduction, where cooperative response actions may be selected over individual response actions if they provide greater risk reduction in terms of exposure time, potential injury or damage, or other quantifiable measures. However, in some embodiments, a cooperative response action may be used to contain or constrain a vehicular threat, which as a result may cause a heightened risk for a vehicle in exchange for reducing risk to another vehicle. For example, a cooperative response action may be implemented in order to protect a specific vehicle, such as by coordinating the movement of one or more vehicles (e.g., protection vehicles) to prevent a vehicular threat from being able to reach the specific vehicle. As another example, where debris causes a hazard behind a vehicular threat, a cooperative response action may place vehicles just outside the risk area to prevent other vehicles (e.g., operated by human drivers) from entering the risk area. As yet another example, a cooperative response action may arrange vehicle trajectories such that the vehicular threat cannot avoid being in front of or behind the vehicles implementing a cooperative response action. For instance, a cooperative response action may place a vehicle in front of a vehicular threat while also having other vehicles pass in a platoon formation alongside the vehicular threat until all vehicles are ahead of the vehicular threat. Next, a cooperative response action may then maintain gaps between the vehicles such that the vehicular threat does not have an opportunity to advance through the coordinated vehicles.

In some embodiments, command module 230 may also generate individual or cooperative response actions among connected vehicles to facilitate the approach of emergency vehicles to a vehicular threat (e.g., move all vehicles to the right most lane) or to contain or constrain a vehicular threat until emergency vehicles are able to arrive. In various embodiments, command module 230 may place vehicles by type (e.g., size, weight, vehicle class) to protect the sides, front, back, or corners of smaller vehicles or to protect vehicle occupants at greater risk due to vehicular occupancy data associated with a vehicle, such as the number, location, or other information as may available regarding the occupants (e.g., a child in a car seat) or a vehicular purpose (e.g., school bus, ambulance). In such embodiments, command module 230 may determine such cooperative or individual response actions in order to optimize protection for vehicle, even if it places one or more of protection vehicles at higher risk relative to a vehicular threat (e.g., by placing a protection vehicle within the risk area of or in closer proximity to vehicular threat). In various embodiments, command module 230 may receive vehicle protection data (e.g., from other vehicles within the vehicular micro-cloud) in the form of vehicle types, vehicle occupancy data, or other vehicle characteristics relevant to optimizing a cooperative response action so as to protect a vehicle, which may then be used with any methods and systems described herein.

Figure 5A:
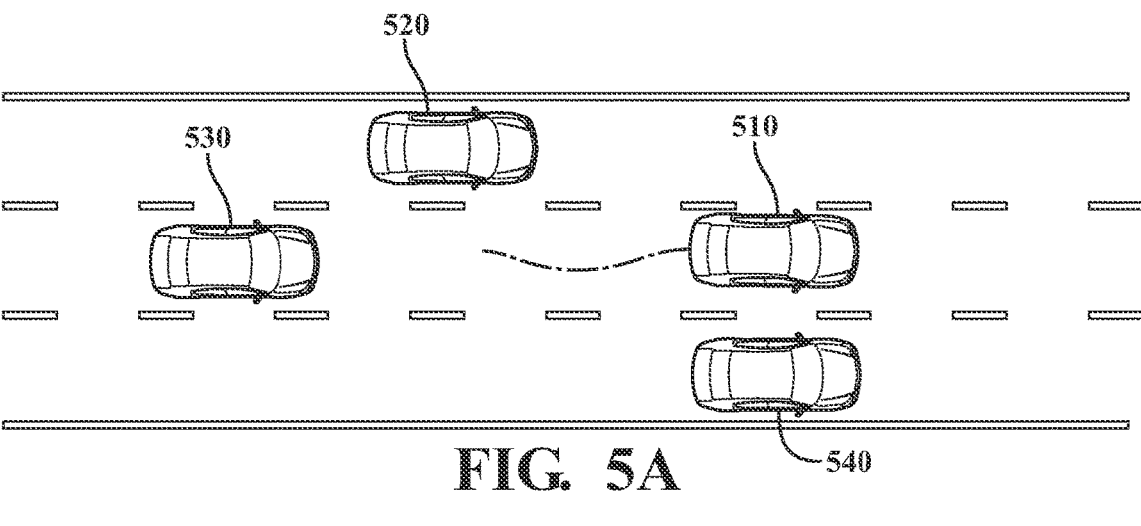
FIGS. 5A-C illustrate one example of a cooperative management strategy involving an individual response action.
Figure 5B:
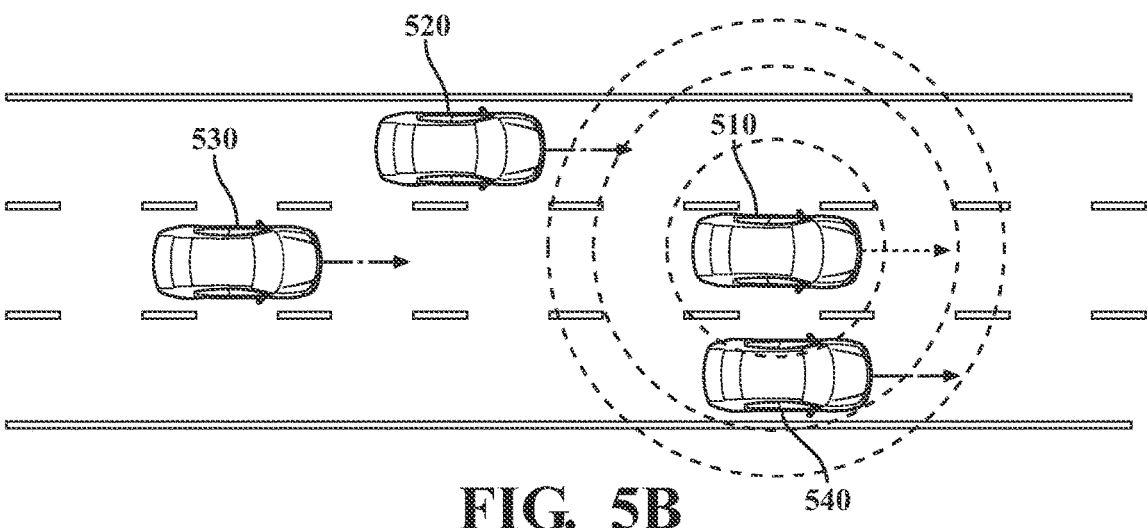
Figure 5C:
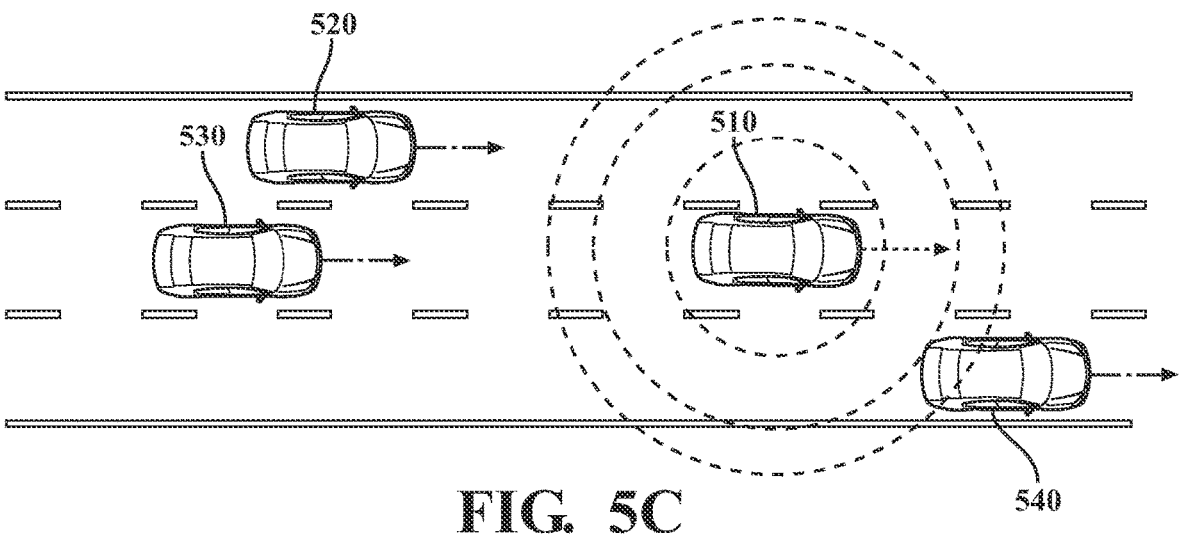

With respect to FIG. 5A-C, an example of an individual response action is shown. In FIG. 5A, a vehicular threat 510 with a low severity may be detected (e.g., distracted driving). For example, based on a distracted driving model measuring lateral deviations and other factors in the anomalous event data, the vehicular threat 510 may be determined to be above a first threshold (e.g., 0.3) while still below a second threshold (e.g., 0.5). In FIG. 5B, command module 230 may determine a threat profile including one or more risk areas for vehicular threat 510; receive planned trajectories of nearby connected vehicles 520, 530, or 540; and estimate the trajectory of vehicular threat 510. In FIG. 5C, command module 230 may generate and send individual response actions instructing vehicles 520, 530, or 540 to speed up or slow down and then maintain at least a minimum distance from vehicular threat 510. For example, based on the low severity score, that only vehicle 540 is in the risk area, and that no coordination between vehicles 520 and 530 would benefit vehicle 540 (e.g., because vehicle 540 has a clear path to exit the risk area, unencumbered by either vehicle 520 or vehicle 530), command module 230 may determine that individual response actions are sufficient for vehicles 520, 530, and 540.

Figure 6A:
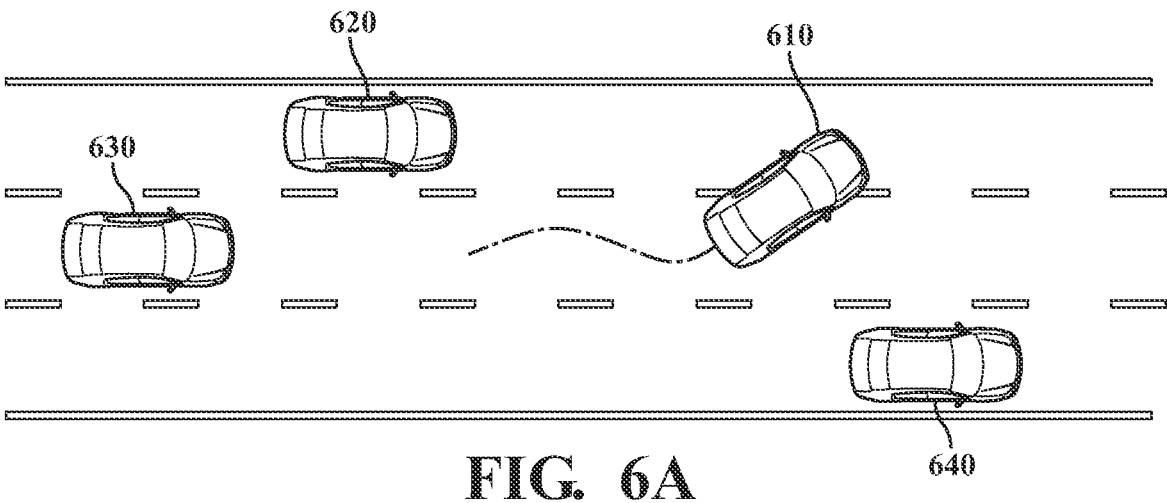
FIGS. 6A-C illustrate one example of a cooperative management strategy involving an individual response action and a cooperative response action.
Figure 6B:
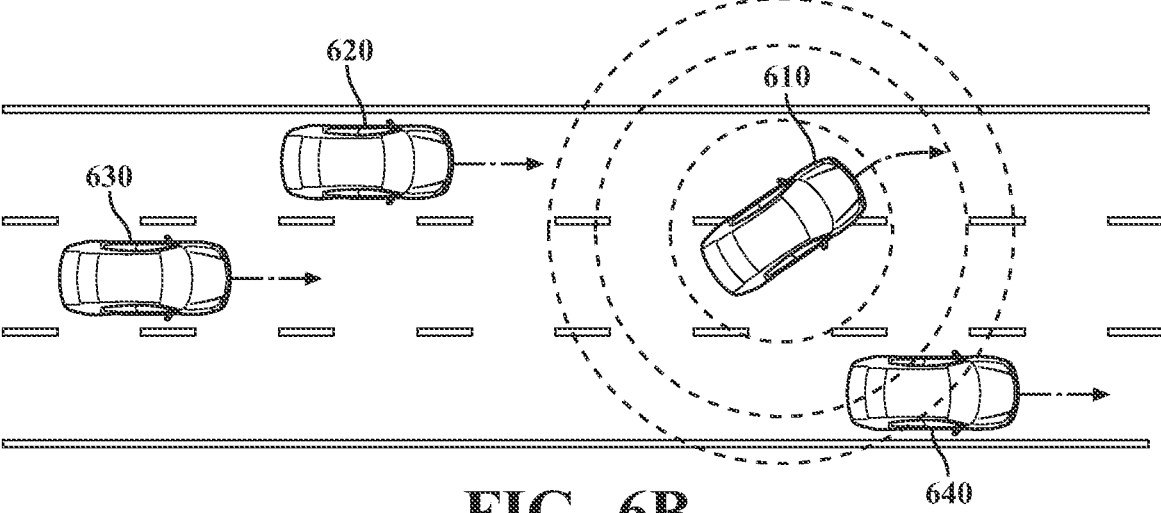
Figure 6C:
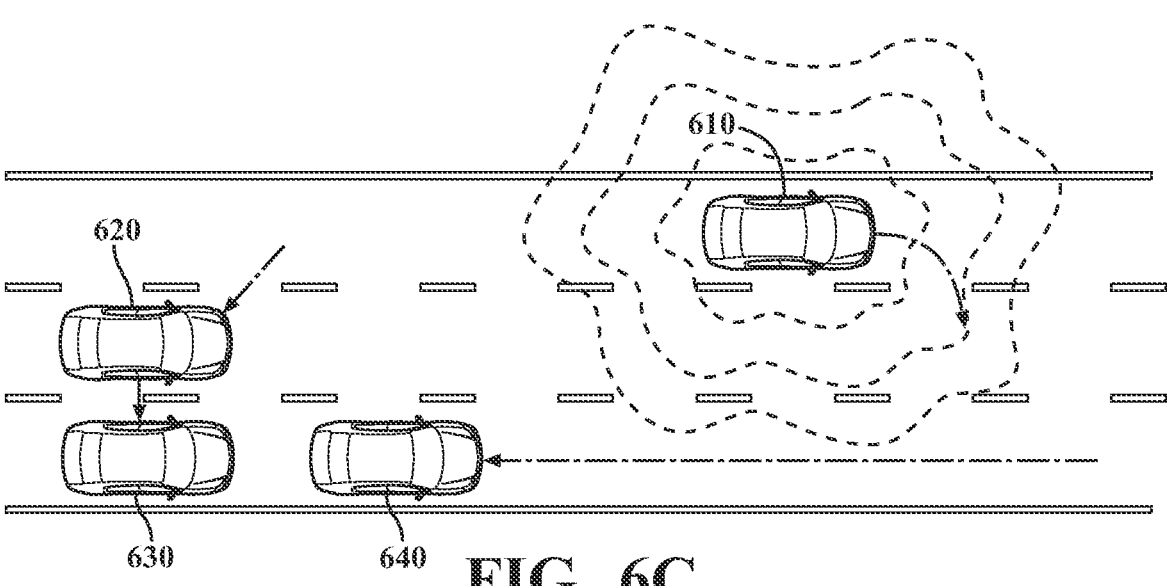

With respect to FIG. 6A-C, an example of a mix of individual and cooperative strategies is shown. In FIG. 6A, a vehicular threat 610 with a high severity may be detected. For example, based on a distracted driving model measuring lateral deviations and other factors in the anomalous event data, the vehicular threat 610 may be determined to be above a high threshold (e.g., 0.7). In FIG. 6B, command module 230 may determine a threat profile including one or more risk areas for vehicular threat 610; receive planned trajectories of nearby connected vehicles 620, 630, or 640; and estimate the trajectory of vehicular threat 610. In FIG. 6C, command module 230 may generate and send individual and cooperative response actions instructing vehicles 620, 630, or 640 to speed up or slow down, change lanes, or maintain at least a minimum distance from vehicular threat 610. For instance, command module 230 may determine that vehicle 630 should change lanes so that vehicle 620 may also change lanes at the same time as it moves back from vehicular threat 610. Command module 230 may determine the need for such a coordinated response action because of an instruction or request to clear a path for an oncoming emergency vehicle (e.g., received from a traffic controller in communication with a vehicular micro-cloud containing vehicles 620, 630, and 640). Command module 230 may also determine that vehicle 640 should receive an individual response action to fall back outside of the one or more risk areas associated with vehicular threat 610, such as where vehicle 640 may be prevented from advancing out of the risk area (e.g., due to vehicles ahead that are not within a vehicular micro-cloud containing vehicles 620, 630, and 640).

Figures 7A, 7B, 7C, 7D:
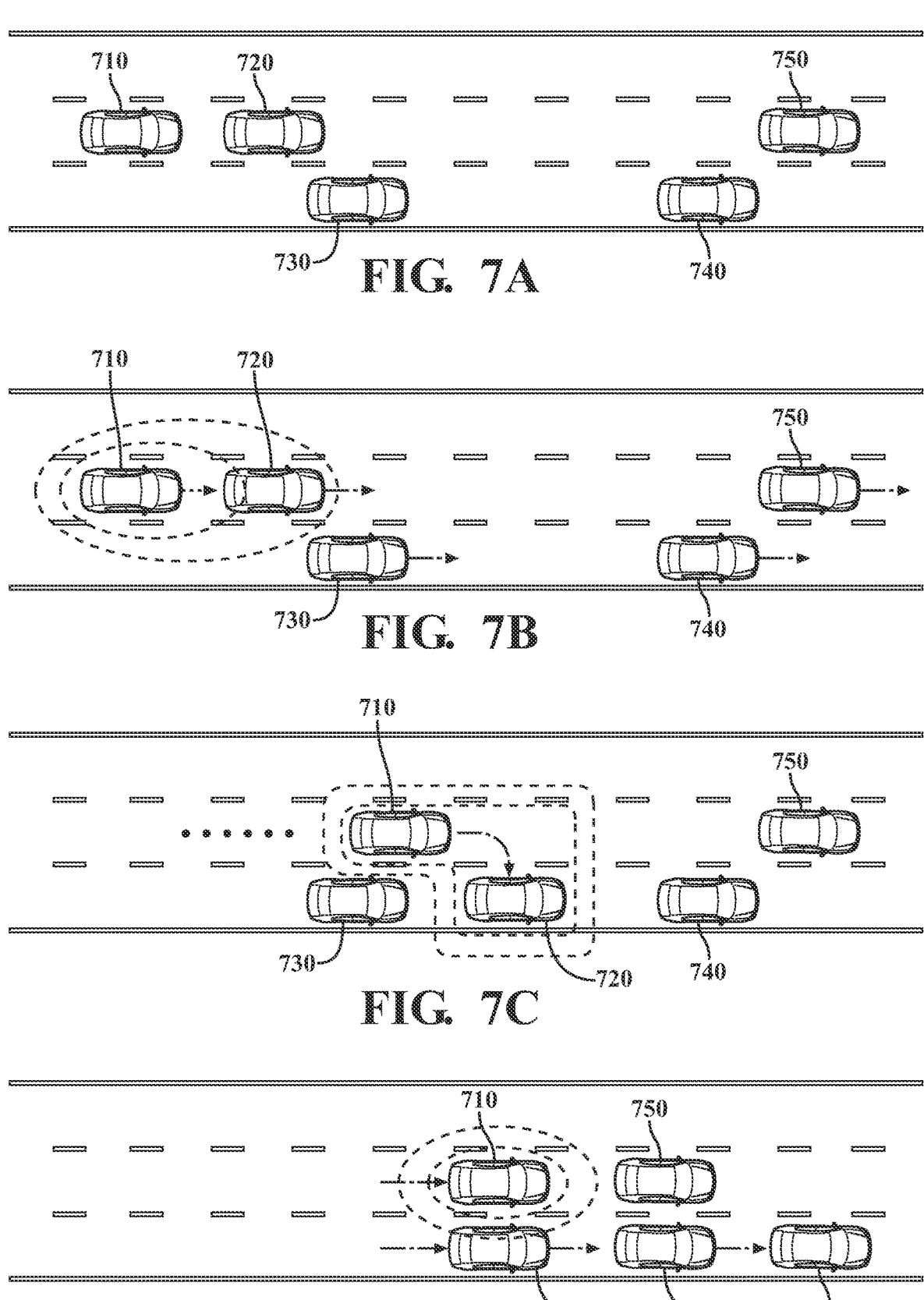
FIGS. 7A-D illustrates one example of a cooperative management strategy for providing protection.

With respect to FIG. 7A-D, an example of a cooperative management strategy for protection is shown. In FIG. 7A, a vehicular threat 710 with a high severity may be detected (e.g., aggressive driving) in relation to vehicle 720 (e.g., a target of road rage). For example, an aggressive driving model may evaluate excessive honking, weaving, tailgating, light flashing as indicating a high level of severity. In some embodiments, command module 230 may also determine a target of such aggressive driving based on such modeling (which may further result in command module 230 sending or displaying a message to a vehicle operator or occupant(s) asking if they require assistance in avoiding vehicular threat 710).

In FIG. 7B, command module 230 may determine a threat profile including one or more risk areas for vehicular threat 710; receive planned trajectories of nearby connected vehicles 720, 730, 740, or 750; and estimate the trajectory of vehicular threat 710. In FIG. 7C, command module 230 may generate and send individual or cooperative response actions instructing vehicles 720, 730, or 740 to form a vehicle platoon around vehicle 720, wherein the gaps between vehicles are too small for vehicular threat 710 to move within the platoon. For example, a cooperative response action may instruct vehicles 730 and 740 to maintain a gap of 35 feet relative to each other, while an individual response action instructs vehicle 720 to enter the center of the gap. In FIG. 7D, command module 230 may then generate and send individual or cooperative response actions instructing vehicles 720, 730, 740, or 750 to move into a position where exposure of vehicle 720 to vehicular threat 710 is minimized. For example, a cooperative response action may instruct vehicles 720, 730, and 740 to advance as a platoon, while an individual response action may instruct vehicle 750 to maintain its position.

Where a cooperative management action for protection has been implemented successfully, command module 230 may then subsequently generate individual or cooperative actions to facilitate a protected vehicle in exiting from the road (e.g., vehicle 720, via an off-ramp), while other vehicles (e.g., vehicles 730, 740, and 750) prevent a vehicular threat (e.g., vehicular threat 710) from similarly exiting the road. In addition, command module 230 may generate individual or cooperative actions among connected vehicles to move a vehicle in danger (e.g., a vehicle being pursued by a vehicular threat, a vehicle having an injured occupant) toward a particular location (e.g., a police station, hospital) or toward responding emergency vehicles.

Figures 8A, 8B, 8C, 8D:
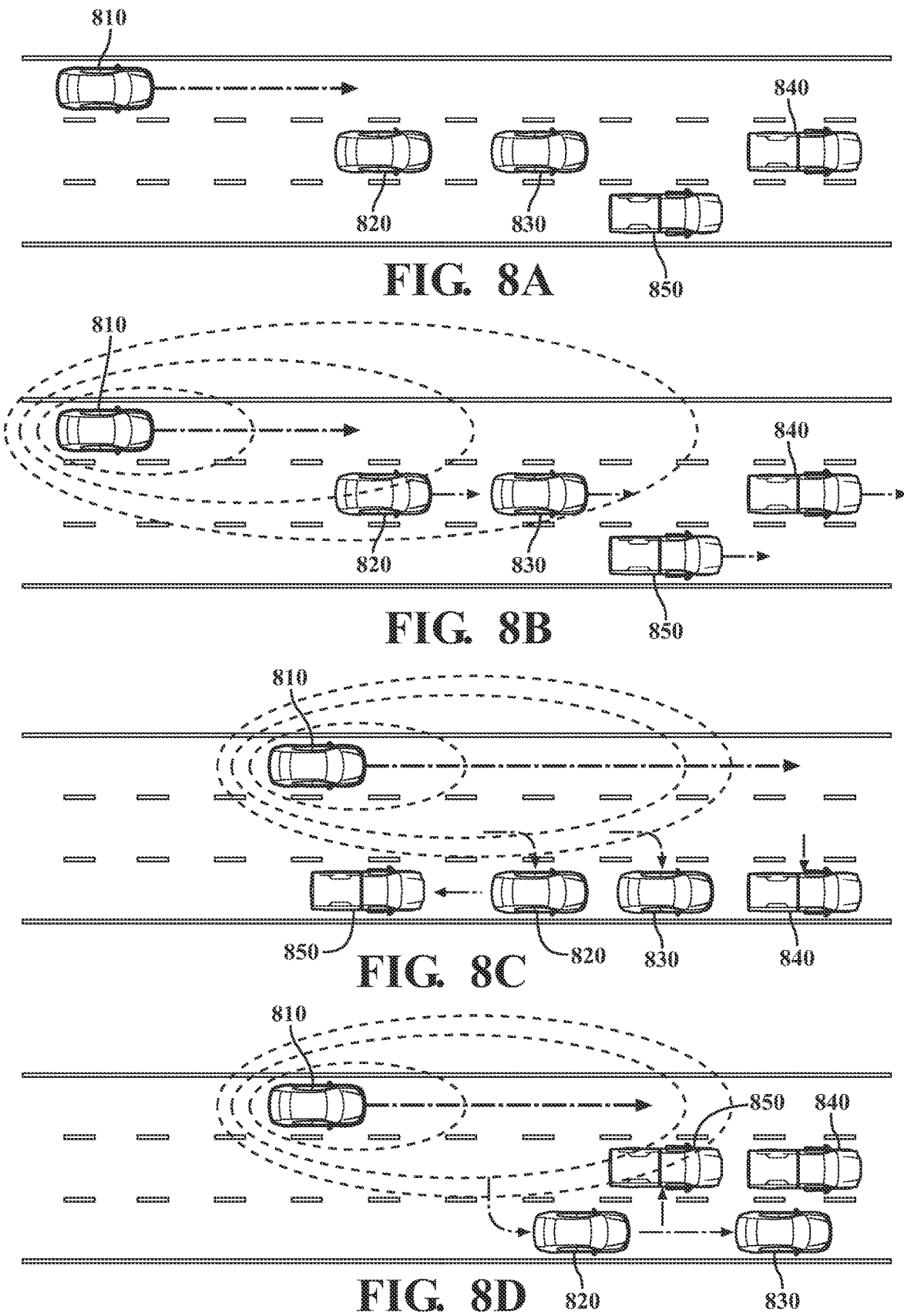
FIGS. 8A-D illustrates another example of a cooperative management strategy for providing protection.

With respect to FIG. 8A-D, a further example of a cooperative management action for protection is shown. In FIG. 8A, a vehicular threat 810 with a high severity may be detected (e.g., reckless driving) approaching vehicles 820, 830, 840, and 850 at high speeds. In FIG. 8B, command module 230 may determine a threat profile including one or more risk areas for the vehicular threat; receive planned trajectories of nearby connected vehicles 820, 830, 840, or 850; and estimate the trajectory of vehicular threat 810. In FIG. 8C, command module 230 may determine that vehicular threat 810 poses the highest risk to vehicles 820 and 830 (e.g., due to their location, vehicle type, number/location of occupants). As such, command module 230 may then implement a cooperative response action such that vehicles 820 and 830 are moved between larger vehicles 840 and 850, thereby reducing potential risks to vehicles 820 and 830. Alternatively, command module 230 as shown in FIG. 8D may implement a cooperative response action where vehicles 840 and 850 move to a position protecting the sides of vehicles 820 and 830 from the vehicular threat 810.

It should be appreciated that command module 230 in combination with a prediction model 260 may form a computational model such as a machine learning logic, deep learning logic, a neural network model, or another similar approach. In one embodiment, prediction model 260 is a statistical model such as a regression model that may determine severity scores, risk areas, or assist in evaluating individual or cooperative management actions based on sensor data 250 or other sources of information as described herein. Accordingly, predictive model 260 may be a polynomial regression (e.g., least weighted polynomial regression), least squares or another suitable approach.

Moreover, in alternative arrangements, prediction model 260 is a probabilistic approach such as a hidden Markov model. In either case, command module 230, when implemented as a neural network model or another model, in one embodiment, electronically accepts sensor data 250 as an input, which may also include anomalous event data. Accordingly, command module 230 in concert with prediction model 260 may produce various determinations/assessments as an electronic output that characterizes the noted aspect as, for example, a single electronic value. Moreover, in further aspects, cooperative management system 170 may collect the noted data, log responses, and use the data and responses to subsequently further train predictive model 260.

Figure 9:
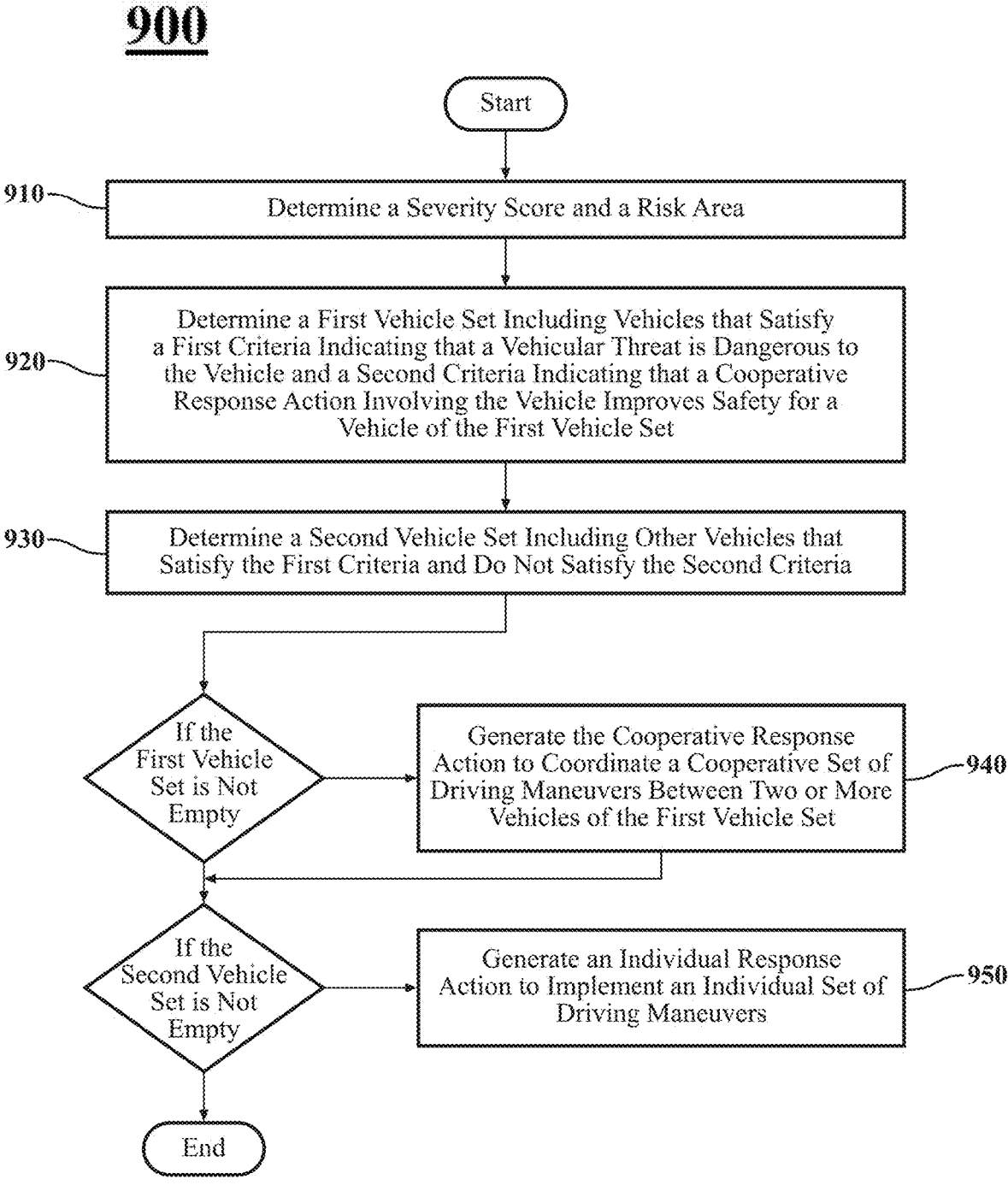
FIG. 9 illustrates one example of a method for implementing cooperative management strategies.

FIG. 9 illustrates a flowchart of a method 900 that is associated with implementing cooperative management strategies. Method 900 will be discussed from the perspective of the cooperative management system 170 of FIGS. 1 and 2. While method 900 is discussed in combination with the cooperative management system 170, it should be appreciated that the method 900 is not limited to being implemented within cooperative management system 170 but is instead one example of a system that may implement method 900.

At 910, command module 230 may determine, in relation to a behavior of a vehicular threat, a severity score and a risk area. For example, command module 230 may receive anomalous event data via sensor data 250 or from vehicular micro-cloud messages received via communication system 180. Command module 230 may then evaluate the anomalous event data using one or more models to determine one or more severity scores for a vehicular threat. In determining a severity score of a vehicular threat, command module 230 may use pre-determined models (e.g., that provide a severity score based on the frequency, magnitude, or other measurable characteristics), adaptive or machine learning models, or a combination of both. The anomalous event data may also be analyzed by command module 230 to determine a risk area around vehicular threat. One or more risk areas may be pre-defined, such as by one or more functions specifying distances to establish a risk area around the object based on anomalous event data or by dynamic or machine learning models evaluating the anomalous event data. In some embodiments, command module 230 may further calculate threat scores (e.g., based on the severity score of the vehicular threat and the location of each vehicle relative to one or more risk areas). In such embodiments, the determination of threat scores may also be further based on estimated or planned trajectories.

At 920, command module 230 may determine a first vehicle set where each vehicle satisfies a first criteria, wherein satisfying the first criteria indicates that the vehicular threat is dangerous to the vehicle, and satisfies a second criteria, wherein satisfying the second criteria indicates that a cooperative response action involving the vehicle is capable of improving safety for at least one vehicle of the first vehicle set.

Command module 230 may use a variety of criteria to establish whether a vehicle satisfies a first criteria, thereby indicating that a vehicular threat is dangerous to the vehicle. For example, a first criteria may be whether the severity score of a vehicular threat is above a threshold (e.g., 0.5), which may be relied on to indicate that a vehicular threat is dangerous to vehicles. Such a first criteria may further require satisfying a second threshold (e.g., whether the distance of the vehicle from the vehicular threat is less than the boundary of risk area), so as to further distinguish based on a risk area which vehicles are at risk from the vehicular threat if it is indicated to be dangerous. As another example, a first criteria may be whether the threat score associated with a vehicle is above a threshold, which may be relied on to indicate that a vehicular threat is dangerous to the vehicle.

Command module 230 may also use a variety of criteria to establish whether a vehicle satisfies a second criteria, thereby indicating that a cooperative response action involving the vehicle is capable of improving safety for at least one vehicle of the first vehicle set. For example, such criteria may be based on whether a vehicle is suitable or not as a protection vehicle (e.g., vehicle is an SUV, truck, semi-truck); whether a vehicle would benefit from the presence of a protection vehicle (e.g., vehicle is a school bus); whether the vehicle's ability to achieve a lower threat score or leave a risk area is diminished by the location or trajectory of another vehicle; whether the vehicle's location or trajectory diminishes the ability of another vehicle to achieve a lower threat score or leave a risk area; whether the vehicle is necessary to implement a platoon operation successfully; and so on. Command module 230 may also measure safety for a vehicle using a variety of metrics. For example, command module 230 may measure safety based on a vehicle's location in relation to a risk area (e.g., outside a risk area is safer than within); a threat score (e.g., a lower threat score is safer); the extent to which a vehicular threat is constrained from a vehicle being protected (e.g., full denial is safer than partial denial); the extent to which a vehicular threat would need to change its course to reach a vehicle being targeted (e.g., the larger the change in a vehicular threat's trajectory, relative to its original estimated trajectory, the greater the increase in safety for a protected vehicle); and so on.

In some embodiments, command module 230 may further evaluate whether a vehicle satisfies a second criteria by using modeling of possible vehicle actions. For example, command module 230 may place vehicles on a grid pattern, where no two vehicles can exist within a grid square and where a vehicle can only enter a grid square if it is empty or if another vehicle is simultaneously exiting the grid square. Based on such grid model, command module 230 may then determine where coordinated actions improve safety over individual actions, such as when it reduces the time one or more vehicles reside within a risk area.

At 930, command module 230 may determine a second vehicle set to receive at least one individual response action, where each vehicle of the second vehicle set satisfies the first criteria and does not satisfy the second criteria. In some embodiments, a third criteria may be used to add vehicles to the second vehicle set if they fail to satisfy the first criteria and the second criteria. For example, the third criteria may use a threshold that is lower or easier to satisfy (e.g., threat score above 0.3) than a threshold being used in the first criteria (e.g., threat score above 0.5), thereby potentially expanding the number of vehicles that may be added to the second vehicle set.

At 940, command module 230 may generate, if the first vehicle set is not empty, the cooperative response action to coordinate a cooperative set of driving maneuvers between two or more vehicles of the first vehicle set to improve the safety of the at least one vehicle of the first vehicle set. For example, a cooperative response action may be a set of driving maneuvers for a vehicle such as to reduce speed, increase speed, maintain lane, change lanes, follow a trajectory, form a platoon, and so on, where such instructions if implemented by two or more vehicles would result in at least one coordinated movement between the two or more vehicles. Such an cooperative response action may be generated on the basis of increasing the safety of one or more cooperating vehicles (e.g., by increasing their distance from a vehicular threat, by reducing threat scores associated with the vehicle); removing cooperating vehicles out of an area (e.g., the risk area) as quickly as possible, carrying out a protective function (e.g., excluding the vehicular threat from entering between the cooperating vehicles), and so on. In some embodiments, command module 230 may place vehicles at greater risk (e.g., as measured by threat scores or location within a risk area) so as to provide greater protection to a more vulnerable vehicle. In some embodiments, command module 230 may determine vehicles that may serve as protection vehicles or may need protection based on vehicle protection data.

At 950, command module 230 may generate, if the second vehicle set is not empty, at least one individual response action to implement an individual set of driving maneuvers. For example, an individual response action may be a set of driving maneuvers for a vehicle such as to reduce speed, increase speed, maintain lane, change lanes, maintain a distance from a vehicular threat, follow a trajectory (e.g., the vehicle's original planned trajectory), progress slowly past the vehicular threat, and so on. Such an individual response action may be generated on the basis of increasing the distance from a vehicular threat, reducing a threat score associated with the vehicle, staying out of an area (e.g., an emergency vehicle corridor), maintaining buffer zones around a vehicular threat, and so on.

In some embodiments, command module 230 may send a cooperative response action or an individual response action to one or more vehicles (e.g., the first vehicle set, the second vehicle set). For example, upon receipt of the message containing the cooperative response action or the individual response action by a vehicle, the message may cause the vehicle to be configured to implement the cooperative response action or the individual response action, which is then subsequently executed by the vehicle. In some embodiments, the vehicle receiving the message may reject the implementation of the cooperative response action or the individual response action (e.g., by giving notice to the driver of when the cooperative response action or the individual response action will be executed and allowing the driver to cancel it before it is executed).

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. "Manual mode" means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, "autonomous vehicle" refers to a vehicle that operates in an autonomous mode. "Autonomous mode" refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor(s) 110 for use thereby. The term "operatively connected," as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A "static obstacle" is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle passenger (e.g., a driver or a passenger). Vehicle 100 may include an output system 135. An "output system" includes any device, component, or arrangement or groups thereof that enable information/data to be presented to a vehicle passenger (e.g., a person, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, cooperative management system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, cooperative management system 170, automated driving module(s) 160, or any combination thereof may control some or all of these vehicle system(s) 140 and, thus, may be partially or fully autonomous.

Processor(s) 110, cooperative management system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, cooperative management system 170, automated driving module(s) 160, or any combination thereof may control the direction, speed, or both of vehicle 100. Processor(s) 110, cooperative management system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with cooperative management system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
generate a vehicle set where each vehicle therein is at risk based on applying a first criteria to a vehicular threat detected through environmental sensor data;
determine a first subset of the vehicle set where all vehicles therein satisfy a second criteria indicating a cooperative response action involving the vehicles would improve safety for a threatened vehicle within the vehicle set;
determine a second subset where each vehicle therein does not satisfy the second criteria;
serve first instructions based on the cooperative response action that when received by the first subset causes the vehicles therein to autonomously perform a coordinated driving maneuver; and
serve, when the second set is not empty, second instructions based on an individual response action that when received by a target vehicle of the second subset causes the target vehicle to autonomously perform a driving maneuver that is not coordinated with driving maneuvers of other vehicles.

2. The system of claim 1, wherein applying the first criteria requires that a severity score of the vehicular threat satisfy a first threshold, wherein satisfying the first threshold indicates that the vehicular threat is dangerous, and that a location of each vehicle in the vehicle set relative to the a risk area of the vehicular threat satisfies a second threshold, wherein satisfying the second threshold indicates that each vehicle of the vehicle set is at risk if the vehicular threat is dangerous.

3. The system of claim 2, wherein the machine-readable instruction to determine the severity score and the risk area is further based on a vehicular-related disturbance generated by the vehicular threat.

4. The system of claim 1, wherein applying the first criteria further includes calculating a threat score of each vehicle of the vehicle set based on a severity score and a risk area of the vehicular threat; and satisfying the first criteria is based on the threat score of each vehicle of the vehicle set satisfying a first threshold, wherein satisfying the first threshold indicates that the vehicular threat is dangerous and each vehicle of the vehicle set is at risk.

5. The system of claim 1, wherein the coordinated driving maneuver includes to place at least one protection vehicle in a position to constrain movement of the vehicular threat relative to another vehicle.

6. The system of claim 5, wherein the coordinated driving maneuver is based on vehicle protection data.

7. The system of claim 1, wherein the machine-readable instruction further includes an instruction to optimize the cooperative response action to constrain the movement of the vehicular threat.

8. A non-transitory computer-readable medium including instructions that when executed by one or more processors cause the one or more processors to:

generate a vehicle set where each vehicle therein is at risk based on applying a first criteria to a vehicular threat detected through environmental sensor data;

determine a first subset of the vehicle set where all vehicles therein satisfy a second criteria indicating a cooperative response action involving the vehicles would improve safety for a threatened vehicle within the vehicle set;

determine a second subset where each vehicle therein does not satisfy the second criteria;

serve first instructions based on the cooperative response action that when received by the first subset causes the vehicles therein to autonomously perform a coordinated driving maneuver; and serve, when the second set is not empty, second instructions based on an individual response action that when received by a target vehicle of the second subset causes the target vehicle to autonomously perform a driving maneuver that is not coordinated with driving maneuvers of other vehicles.

9. The non-transitory computer-readable medium of claim 8, wherein applying the first criteria requires that a severity score of the vehicular threat satisfy a first threshold, wherein satisfying the first threshold indicates that the vehicular threat is dangerous, and that a location of each vehicle in the vehicle set relative to the a risk area of the vehicular threat satisfies a second threshold, wherein satisfying the second threshold indicates that each vehicle of the vehicle set is at risk if the vehicular threat is dangerous.

10. The non-transitory computer-readable medium of claim 9, wherein the instruction to determine the severity score and the risk area is further based on a vehicular-related disturbance generated by the vehicular threat.

11. The non-transitory computer-readable medium of claim 8, wherein applying the first criteria further includes calculating a threat score of each vehicle of the vehicle set based on a severity score and a risk area of the vehicular threat; and satisfying the first criteria is based on the threat score of each vehicle of the vehicle set satisfying a first threshold, wherein satisfying the first threshold indicates that the vehicular threat is dangerous and each vehicle of the vehicle set is at risk.

12. The non-transitory computer-readable medium of claim 8, wherein the coordinated driving maneuver includes to place at least one protection vehicle in a position to constrain movement of the vehicular threat relative to another vehicle.

13. The non-transitory computer-readable medium of claim 12, wherein the coordinated driving maneuver is based on vehicle protection data.

14. A method, comprising:

generating a vehicle set where each vehicle therein is at risk based on applying a first criteria to a vehicular threat detected through environmental sensor data;

determining a first subset of the vehicle set where all vehicles therein satisfy a second criteria indicating a cooperative response action involving the vehicles would improve safety for a threatened vehicle within the vehicle set;

determining a second subset where each vehicle therein does not satisfy the second criteria;

serving first instructions based on the cooperative response action that when received by the first subset causes the vehicles therein to autonomously perform a coordinated driving maneuver; and serving, when the second set is not empty, second instructions based on an individual response action that when received by a target vehicle of the second subset causes the target vehicle to autonomously perform a driving maneuver that is not coordinated with driving maneuvers of other vehicles.

15. The method of claim 14, wherein applying the first criteria requires that a severity score of the vehicular threat satisfy a first threshold, wherein satisfying the first threshold indicates that the vehicular threat is dangerous, and that a location of each vehicle in the vehicle set relative to the a risk area of the vehicular threat satisfies a second threshold, wherein satisfying the second threshold indicates that each vehicle of the vehicle set is at risk if the vehicular threat is dangerous.

16. The method of claim 15, wherein determining the severity score and the risk area is further based on a vehicular-related disturbance generated by the vehicular threat.

17. The method of claim 14, wherein applying the first criteria further includes calculating a threat score of each vehicle of the vehicle set based on a severity score and a risk area of the vehicular threat; and satisfying the first criteria is based on the threat score of each vehicle of the vehicle set satisfying a first threshold, wherein satisfying the first threshold indicates that the vehicular threat is dangerous and each vehicle of the vehicle set is at risk.

18. The method of claim 14, wherein the coordinated driving maneuver includes to place at least one protection vehicle in a position to constrain movement of the vehicular threat relative to another vehicle.

19. The method of claim 18, wherein the coordinated driving maneuver is based on vehicle protection data.

20. The method of claim 14, further comprising optimizing the cooperative response action to constrain the movement of the vehicular threat.

* * * * *